(12) United States Patent
High

(10) Patent No.: US 7,736,575 B2
(45) Date of Patent: Jun. 15, 2010

(54) METHOD OF CREATING CHEMICAL INDUCED PRE-STRESSED ZONES IN CONCRETE

(76) Inventor: Steven L. High, P.O. Box 575, Sandia Park, NM (US) 87047

( * ) Notice: Subject to any disclaimer, the term of this patent is extended or adjusted under 35 U.S.C. 154(b) by 101 days.

(21) Appl. No.: 11/956,062

(22) Filed: Dec. 13, 2007

(65) Prior Publication Data
US 2008/0128942 A1 Jun. 5, 2008

Related U.S. Application Data

(62) Division of application No. 11/008,855, filed on Dec. 9, 2004, now Pat. No. 7,410,351.

(60) Provisional application No. 60/528,687, filed on Dec. 10, 2003.

(51) Int. Cl.
*C08J 7/00* (2006.01)

(52) U.S. Cl. ............... 264/333; 264/232; 264/228

(58) Field of Classification Search ............ 264/228, 264/333, 232
See application file for complete search history.

(56) References Cited

U.S. PATENT DOCUMENTS

| | | |
|---|---|---|
| 1,173,987 A | 2/1916 | Stehm |
| 1,777,100 A | 9/1930 | McClintock et al. |
| 1,782,413 A | 11/1930 | Dietrichs |
| 1,942,000 A * | 1/1934 | Reynolds ............... 264/79 |
| 2,325,087 A * | 7/1943 | Wertz ................. 427/369 |
| 2,739,349 A | 3/1956 | Strauss |
| 3,502,500 A * | 3/1970 | Hoock ................. 428/425.5 |
| 3,896,783 A | 7/1975 | Manning |
| 4,205,040 A * | 5/1980 | Aoyama et al. .......... 264/233 |
| 4,253,816 A * | 3/1981 | Tobias et al. ............ 425/385 |
| 4,416,842 A * | 11/1983 | Nash et al. ............. 264/145 |
| 4,544,346 A | 10/1985 | Allen |
| 4,605,170 A | 8/1986 | Thurner |
| 4,884,958 A | 12/1989 | Lowndes, III et al. |
| 5,111,087 A | 5/1992 | Butka |
| 5,143,780 A * | 9/1992 | Balassa ............... 428/294.7 |
| 5,215,585 A | 6/1993 | Luthra et al. |
| 5,334,060 A | 8/1994 | Butka |
| 5,417,759 A | 5/1995 | Huddleston |
| 5,556,460 A | 9/1996 | Berke et al. |
| 5,579,753 A * | 12/1996 | Chiuminatta et al. ......... 125/12 |
| 5,603,760 A | 2/1997 | Berke et al. |
| 5,626,663 A | 5/1997 | Berke et al. |
| 5,679,150 A | 10/1997 | Kerkar et al. |

(Continued)

*Primary Examiner*—Joseph S Del Sole
*Assistant Examiner*—Kimberly A Stewart
(74) *Attorney, Agent, or Firm*—Deborah A. Peacock; Justin R. Jackson; Peacock Myers, P.C.

(57) ABSTRACT

Embodiments of the present invention comprise a method for creating pre-stressed zones in concrete. In one embodiment, a circular blade is coated with a chemical which retards the setting of the concrete. The circular blade is then rolled through the wet concrete, thus transferring the retarding chemical from the blade into the concrete. The region of wet concrete that has the retarding chemical introduced into it does not set until after the surrounding concrete has set and shrunk, thus creating a pre-stressed zone which typically manifests itself as a crack, visible upon setting of the wet concrete. Other embodiments describe alternative ways of introducing the chemical into the wet concrete.

23 Claims, 17 Drawing Sheets

U.S. PATENT DOCUMENTS

| | | | |
|---|---|---|---|
| 5,904,601 A | 5/1999 | Palokangas et al. | |
| 6,384,141 B2 | 5/2002 | Hirata et al. | |
| 6,471,895 B2 * | 10/2002 | Metten | 264/71 |
| 6,508,006 B1 | 1/2003 | Black | |
| 2002/0031567 A1 | 3/2002 | Magario | |

* cited by examiner

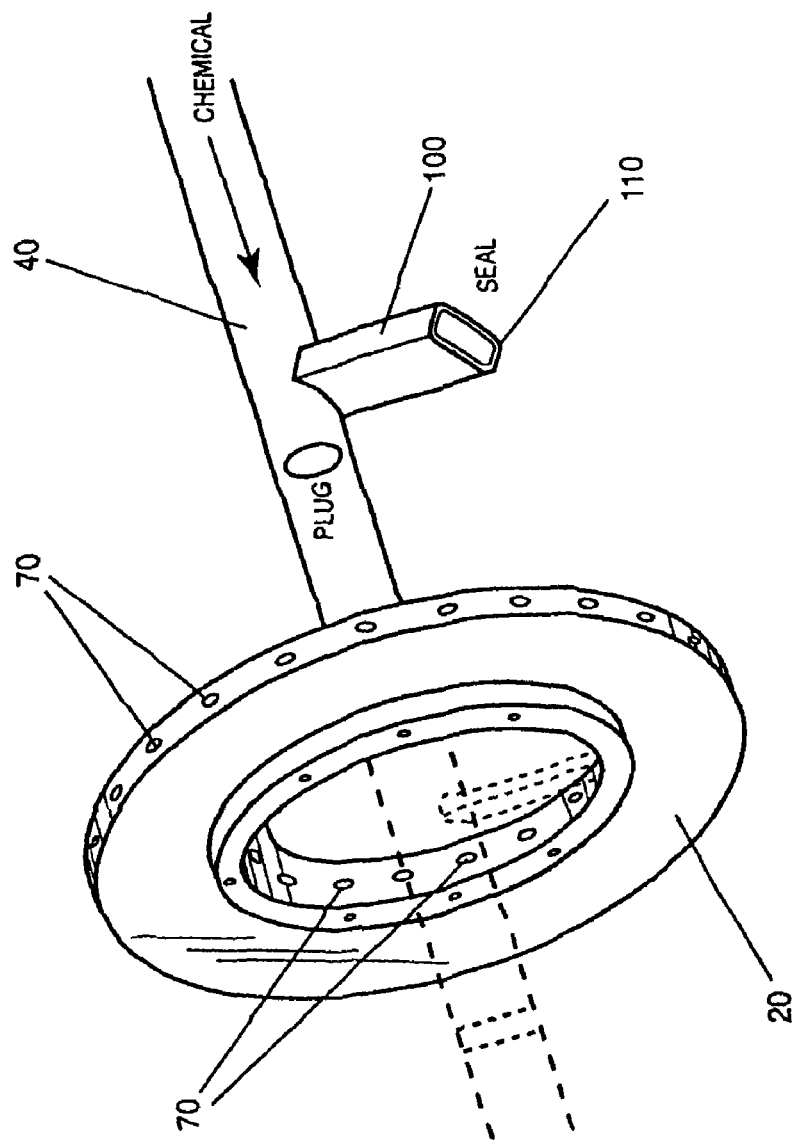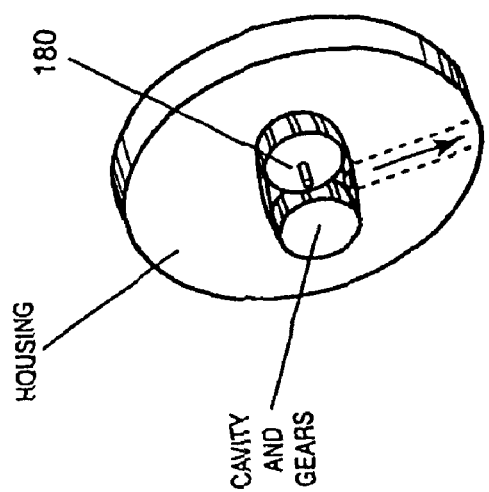
FIG-7

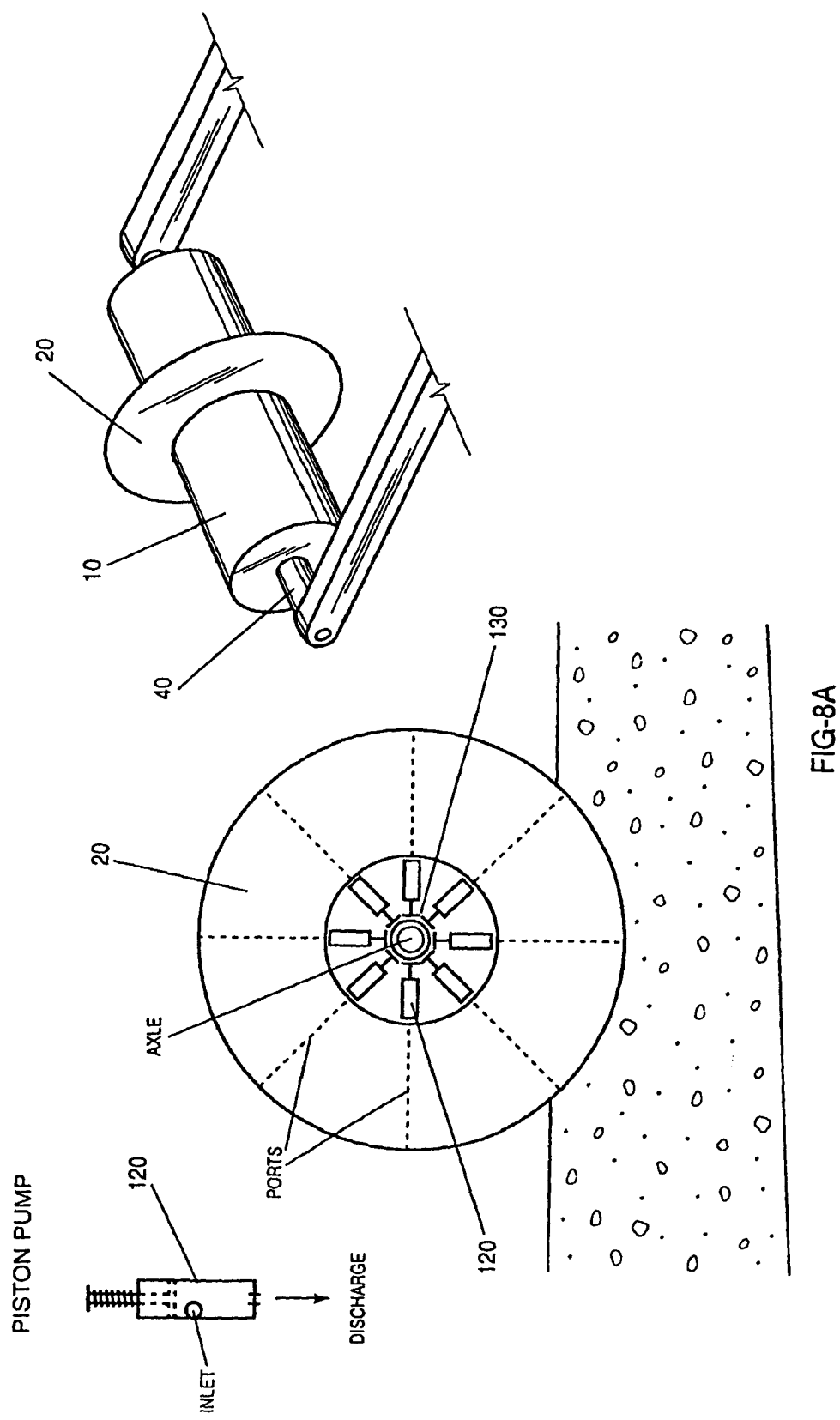

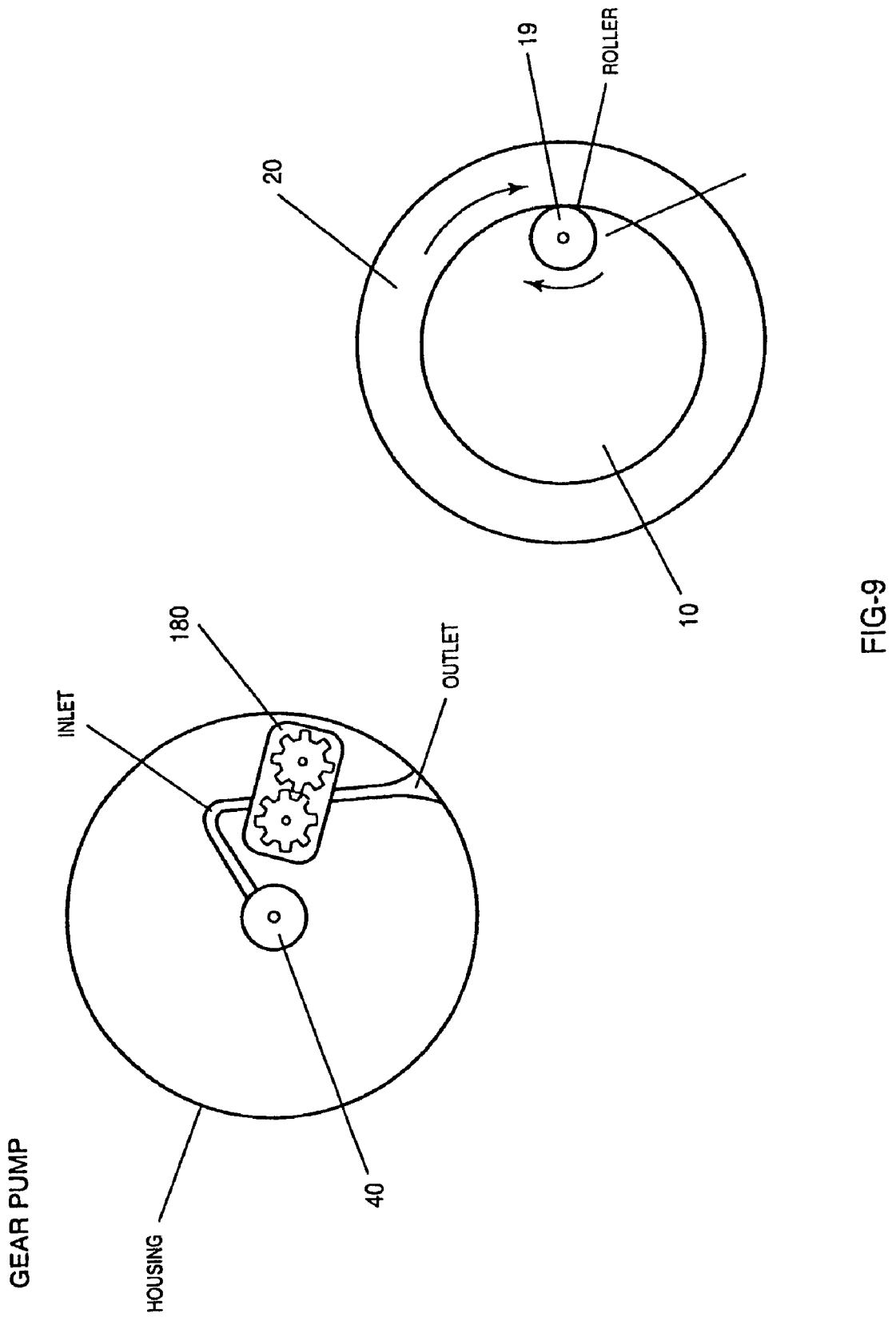

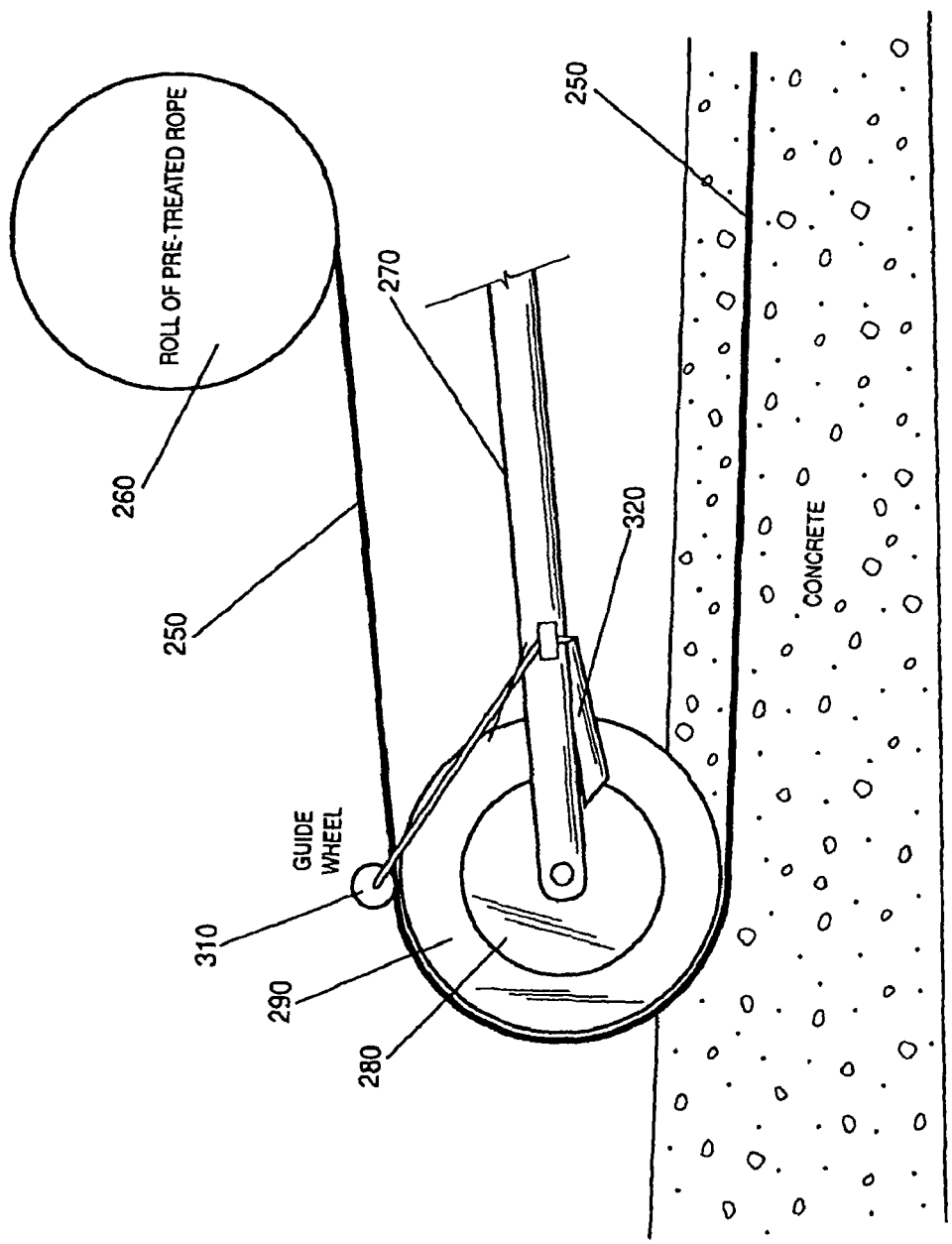

METHOD OF CREATING CHEMICAL INDUCED PRE-STRESSED ZONES IN CONCRETE

CROSS-REFERENCE TO RELATED APPLICATIONS

This application is a divisional application of U.S. patent application Ser. No. 11/008,855, entitled "Chemical Induced Pre-Stressed Zones in Concrete," to Steven L. High, filed on Dec. 9, 2004, which claims the benefit of the filing of U.S. Provisional Patent Application Ser. No. 60/528,687, entitled "Method and Apparatus for Creating Pre-Stressed Zones in Wet Concrete", to Steven L. High, filed on Dec. 10, 2003, and the specifications and claims thereof are incorporated herein by reference.

BACKGROUND OF THE INVENTION

1. Field of the Invention (Technical Field)

The present invention relates to a method for creating pre-stressed zones in concrete through the introduction of a chemical while the concrete is in a liquid stage.

2. Description of Related Art

After a slab of concrete has been poured, one or more pre-stressed zones are then created in the slab. These pre-stressed zones act to guide cracks along straight and predetermined pathways. Typically, such pre-stressed zones are created by cutting through an upper portion of the concrete with a circular saw that is made to travel in a relatively straight line across the slab. Use of such a saw, therefore, requires that the concrete first be allowed to harden. Hardened concrete is quite abrasive and thus typically requires a diamond coated cutting blade with a constant flow of water applied thereto. This process is both slow and expensive. There is thus a present need for a method for installing pre-stressed zones in concrete in a fast and inexpensive manner.

The present invention is directed to a method for creating a pre-stressed zone in wet concrete which includes providing wet concrete, providing a chemical capable of retarding, delaying, or inhibiting the setting of wet concrete, physically penetrating a top surface of the wet concrete, placing the chemical below the top surface of the wet concrete, and allowing the wet concrete to set.

In the method, penetrating a top surface can include rolling a substantially circular blade at least partially through a portion of the wet concrete, as well as pressing a blade at least partially into a portion of wet concrete. The chemical can be sprayed into an opening in the wet concrete, or the chemical can be sprayed onto a blade that is subsequently placed at least partially into the wet concrete. The chemical used in the present invention can also be saturated into a rope which is then at least partially disposed beneath a surface of the concrete.

Regardless of how the chemical is added to the wet concrete, after the chemical has been added, the surface of the wet concrete can optionally be smoothed.

The chemical used in the present invention preferably contains a hydrocarbon solvent and more preferably contains aromatic 100 and/or mineral spirits. Desirable results can also be obtained when sugar-water is used.

The method of the present invention also includes introducing a chemical below a top surface of wet concrete. This method preferably comprises a roller with a blade that is disposed at least partially around an outer surface of the roller, an axle fixedly or rotatably secured to the roller and substantially axially aligned therewith, one or more handles fixedly or rotatably connected to the roller, and a chemical application system which applies a chemical to the blade.

The blade can have a plurality of orifices disposed radially therethrough, and through which the chemical is excreted. Or, the chemical can be applied to the blade with a spraying system.

A pump can be coupled to the roller such that when the roller is rotated, a volume of chemical is pumped which is proportional to the amount of rotation experienced by the roller. A plurality of pistons can be radially disposed within the roller. A cam-shaped member can be attached to an axle thereof such that rotation of the roller causes the cam-shaped member to reciprocate the pistons, thus pumping the chemical.

One or more chemical-distributing wipers can be provided which spread chemical across the blade. Further, one or more wet concrete scrapers can be provided which help to remove wet concrete that sticks to the blade.

The method can be powered by a mechanism, including but not limited to one or more electric motors, gas motors, pneumatic motors, hydraulic motors, combinations of these, etc. The power mechanism can be directly coupled to the method, or a drive mechanism can be provided which transfers power from the power mechanism to the roller or the axle. The power mechanism can be disposed internal of or external to the roller.

The present invention also relates to a method for introducing a chemical below a top surface of wet concrete which includes at least one propulsion member; a power source having an internal power source, an external power source, and/or combinations thereof; a movably positional blade; and a chemical application system.

The apparatus can also have one or more guide mechanisms. The guide mechanism can be one or more tracks, a string guide, and/or a laser guide.

One or more vibrators can also be provided, and the propulsion member can include at least one rotatable leg member and/or at least one wheel. The chemical application system can apply a chemical onto a surface of the blade, and/or apply the chemical directly into a depression of the wet concrete.

An automated controlling mechanism can be provided, which can optionally include a microcontroller.

The present invention also relates to a method for creating a pre-stress zone in wet concrete which includes providing a rope saturated with a chemical, disposing the rope at least partially within wet concrete, and allowing the wet concrete to set. The method can include providing a rope holder, and the rope holder can have a spool and/or a spool holder.

Disposing the rope at least partially within the wet concrete can include disposing the rope at least partially around a circumference of a substantially circular rotatable blade. Optionally, after disposing the rope within the wet concrete, the wet concrete can be smoothed.

The present invention also relates to a method that provides for inserting a chemical-saturated rope below a top surface of wet concrete which includes a roller, an axle at least substantially axially aligned with the roller, at least one handle, and a blade circumferentially disposed around the roller. The blade can include a channel, a groove, an indentation, or a trough.

BRIEF SUMMARY OF THE INVENTION

The present invention comprises a method for creating a pre-stressed zone in concrete comprising the steps of laying down wet concrete; physically penetrating a top surface of the wet concrete; applying a chemical capable of retarding, delaying or inhibiting setting of the wet concrete at the physical penetration; setting the wet concrete; and creating the pre-stressed zone in the concrete during or after the setting of the concrete.

The penetrating step comprises rolling a substantially circular blade at least partially through a portion of the wet concrete. The penetrating step further comprises pressing a blade at least partially into a portion of the wet concrete. The applying step comprises disposing the chemical on a blade and placing the blade at least partially into the wet concrete as well as placing a chemical-saturated rope below the top surface, at least partially within the wet concrete, at least partially around a circumference of a substantially circular rotatable blade. The applying step further comprises inserting the chemical into an opening in, and applying the chemical below the top surface of, the wet concrete created by a blade and then smoothing the wet concrete. The chemical used can comprise an organic solvent such as aromatic 100, mineral spirits, or a sugar-water solution.

A primary object of the present invention is to negate the arduous task, currently available, for creating pre-stressed zones in set concrete.

Another object of the present invention is to provide a method which inexpensively enables a user to easily and inexpensively create pre-stressed zones in concrete.

A primary advantage of the present invention is that methods are provided which enables a user to easily and inexpensively create pre-stressed zones in wet concrete.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 7 is a perspective view of the 6A and B embodiment in which the blade has been slid away from the axle of the present invention;

FIG. 8A shows an embodiment of the present invention where chemical is injected into the ports through piston pumps;

FIG. 9 is a cut-away end view of an embodiment of the present invention wherein a gear pump is used to supply chemical to the blade;

FIG. 11A is a side view of an embodiment for placing chemical containing rope into wet concrete;

DETAILED DESCRIPTION OF THE INVENTION

The present invention is directed to creating pre-stressed zones or joints in concrete. More particularly the present invention is directed to creating pre-stressed zones in concrete by introducing a chemical into the area where a pre-stressed zone is desired. The chemical delays the setting of concrete in this area, thus this portion of the concrete remains wet while the rest of it dries. Since concrete typically shrinks when it dries, the shrinkage caused by the rest of the concrete drying, causes pulling away from the still wet portion. This pulling results in a pre-stressed zone being created in this area of the concrete. After the treated portion of concrete finally dries, the pre-stressed zone is typically evidenced by a crack or joint traversing this portion of the concrete.

The term "chemical" as used throughout the specification and claims is intended to include but not be limited to any chemical, or combination thereof, which is capable of retarding, delaying, and/or inhibiting the setting of wet concrete. The chemical used is preferably a common water and sugar solution, or a commercially available concrete setting retardant such as Sure Lift (J-5), Sure Lift (J-6), Top Etch-Regular or Deep, or a combination thereof. It is also preferable that lubricating oil be added to the chemical(s) such that any moving parts contacted by the chemical can be lubricated. The term "rope" as used throughout the specification and claims is intended to include but not be limited to any type of rope, twine, string, yarn, or structure capable of being saturated with a chemical.

The term "concrete" as used throughout the specification and claims is intended to include but not be limited to cements, cement and aggregate mixtures, concrete, mortar as well as any similar mixture or compound which can be poured in a liquid form prior to setting into a substantially solid form, and for which a retardant, inhibitor, or delaying agent is known to produce desirable results for retarding, inhibiting and/or delaying its setting into a substantially solid form.

Figure 1:
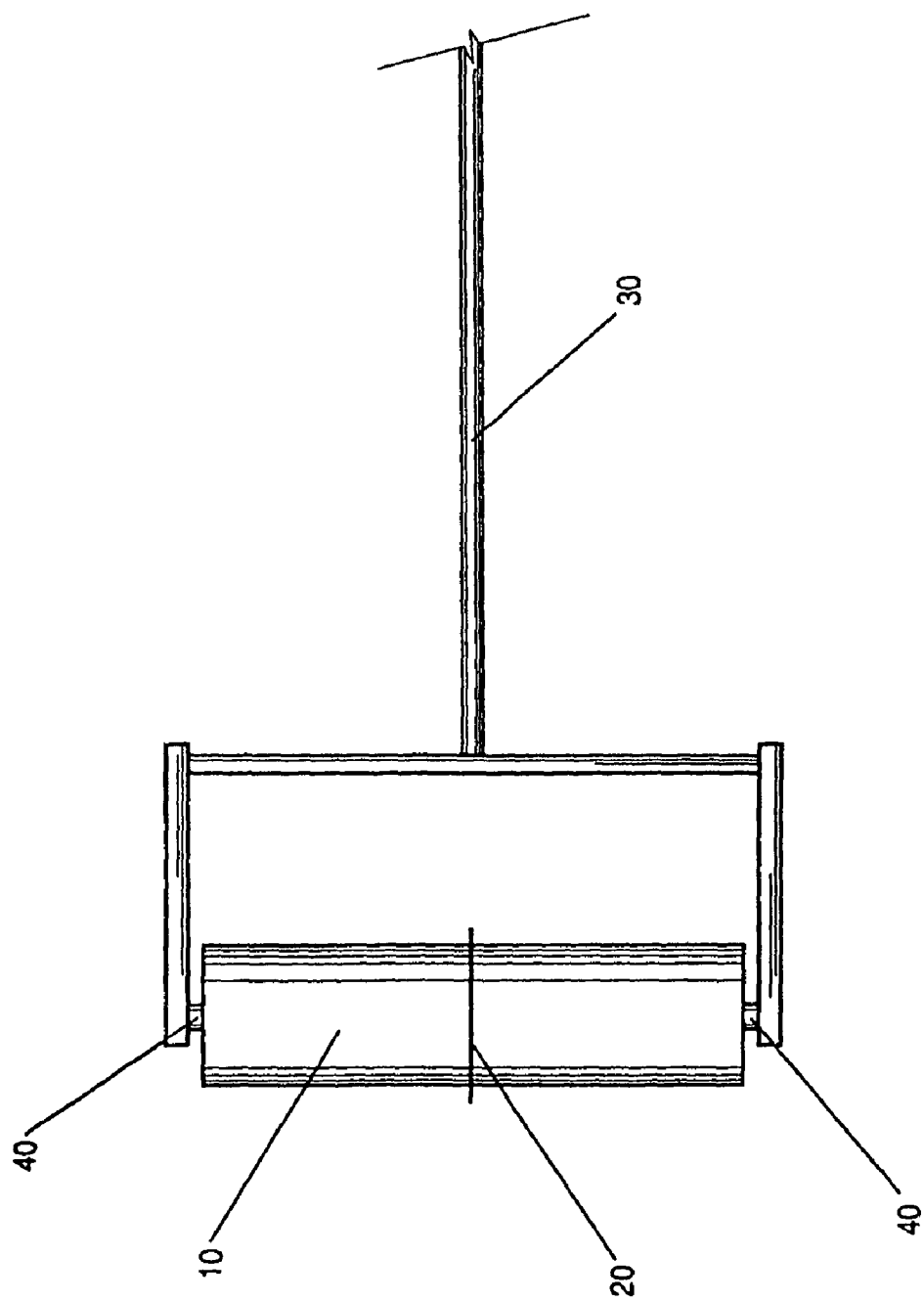
FIG. 1 is a top view showing the basic configuration of the apparatus of the present invention.

As depicted in FIG. 1, the present invention preferably uses applicator drum 10 having at least one protruding blade 20 disposed on its surface. Drum 10 is preferably substantially hollow, and is preferably attached to handle 30 at each end of axle 40. Chemical is applied to blade 20. As drum 10 rotates across a section of wet concrete, blade 20 sinks into the wet concrete and the chemical, disposed on blade 20, is then introduced into the wet concrete. Since the concrete is still in a liquid state, the rut caused by blade 20 is filled back in by the inherent liquid flowing capabilities of the wet concrete. If desired, a float and or screen can be applied to the surface of the concrete where the chemical was introduced.

Figure 2:
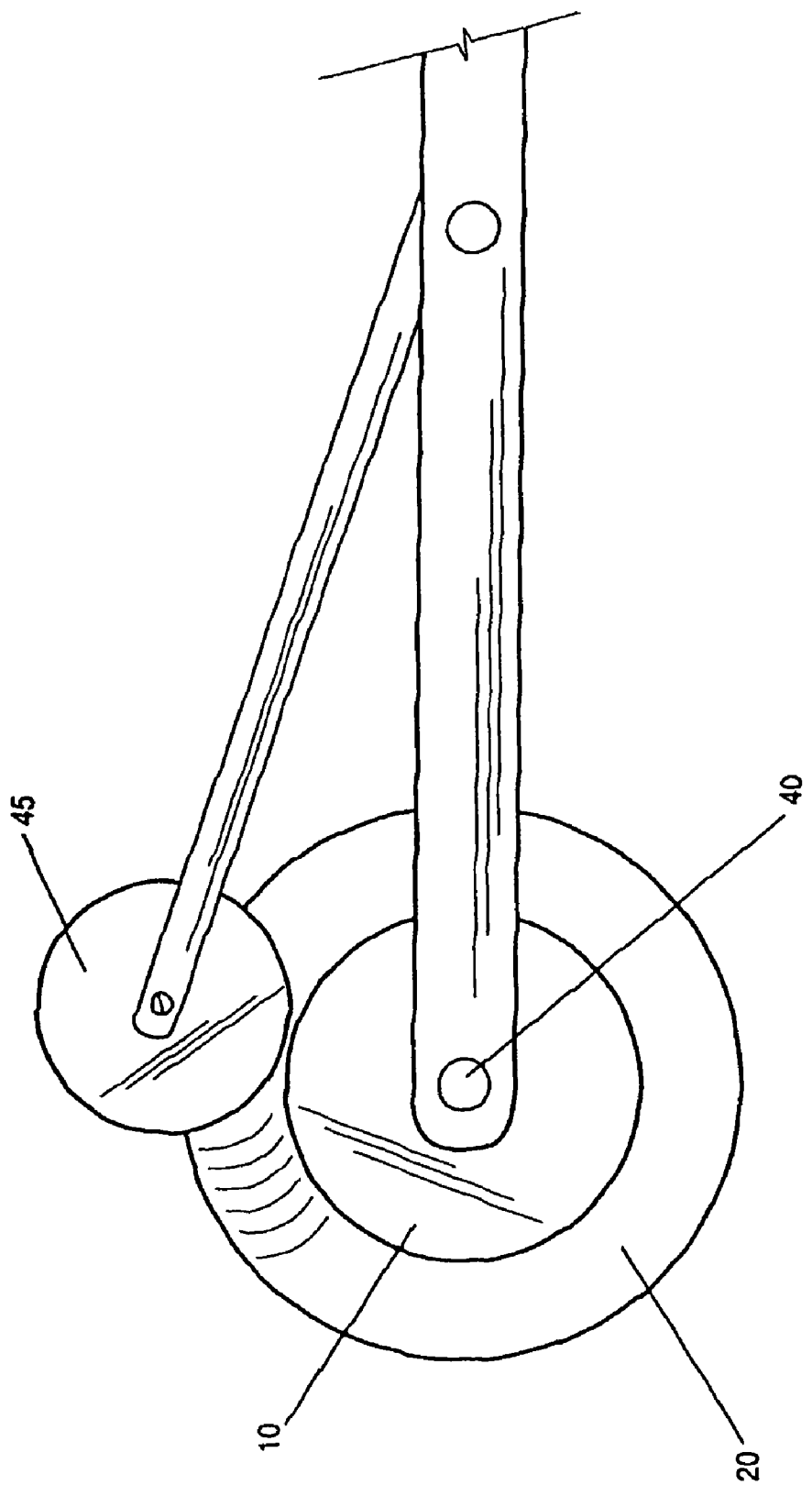
FIG. 2 is a side view showing the blade of the FIG. 1 embodiment having wiper wheels for evenly distributing the chemical.

A number of ways of applying chemical to blade 20 can be utilized. Chemical can simply be sprayed onto blade 20. Such spraying can be achieved by a number of apparatuses and can include, but is not limited to a hand-operated pump sprayer, an electrically powered sprayer, or a gas-powered sprayer. As shown in FIG. 2, blade 20 can be sandwiched between a pair of wipers 45 such that the chemical applied thereto is more evenly distributed on the surface of blade 20. While wipers 45 depicted in FIG. 2 are in the shape of wheels, numerous other configurations can easily be adapted by those skilled in the art, and will also produce desirable results. Wipers 45 are preferably made from a plastic, rubber, or a material such as or similar to that known as "Scotch Bright" as manufactured by the 3M Corp. However, any material capable of spreading the chemical applied to the blade will produce desirable results.

Since the concrete takes a short duration to flow and close the gap caused by shoving blade 20 through it, a nozzle can be disposed immediately behind blade 20 such that chemical emitted from the nozzle is deposited within the gap created by blade 20.

Figure 6A:
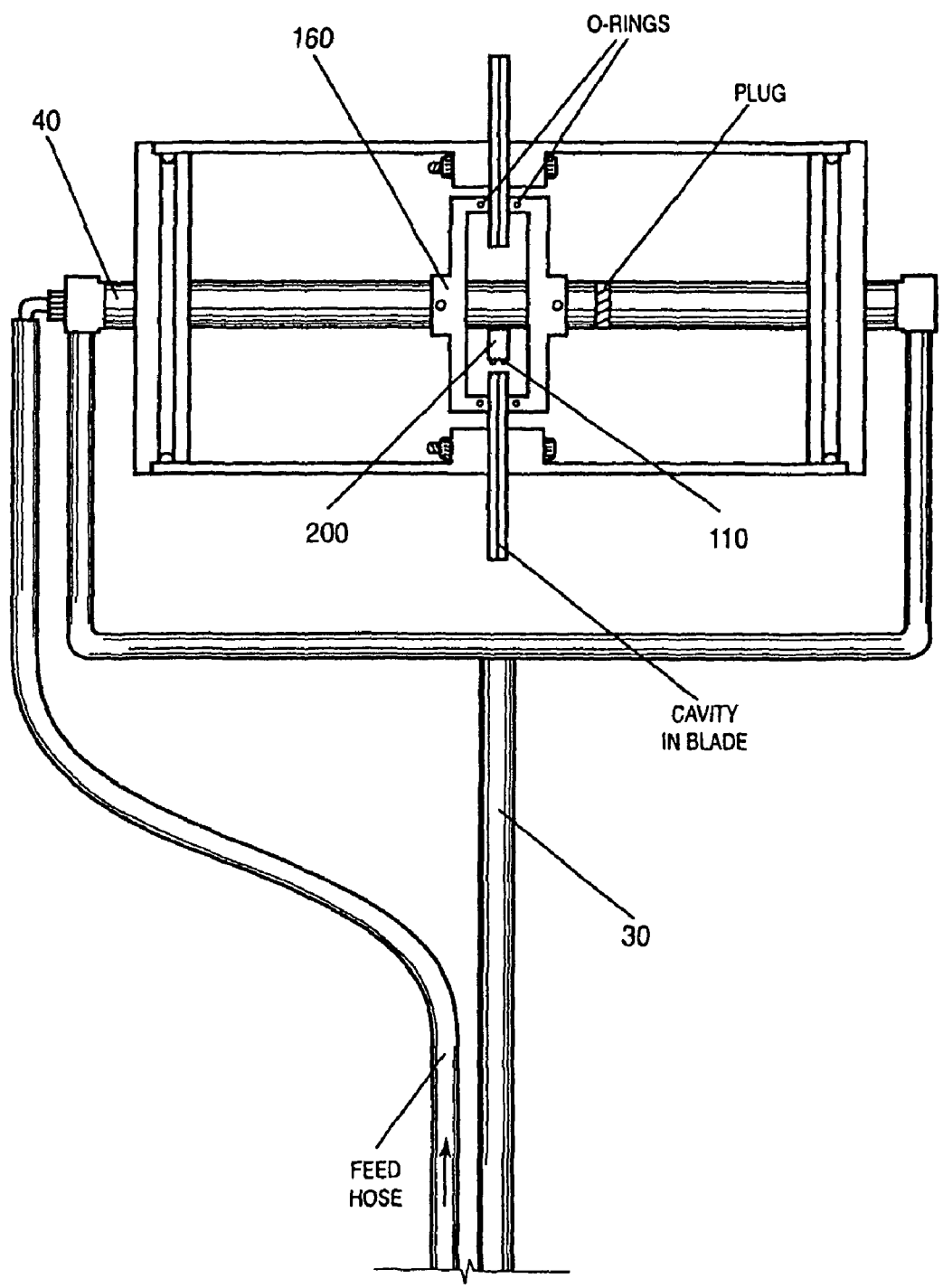
FIGS. 6A and B are cut-away views showing alternative embodiments of the present invention for distributing chemical from the axle to the blade.
Figure 6B:
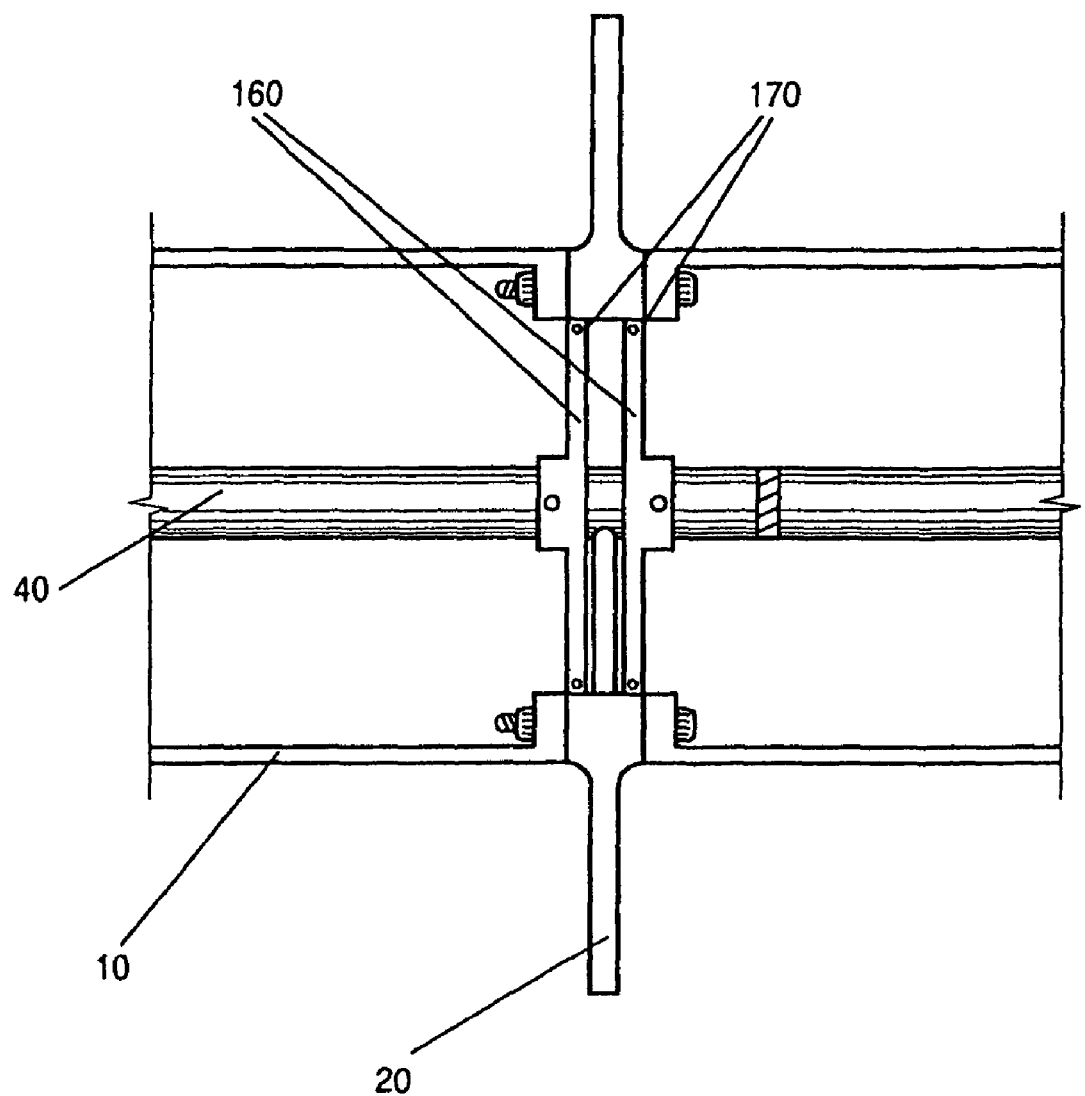

In another embodiment of the present invention, as shown in FIGS. 6A, 6B, and 7, blade 20 has ports 70 radially disposed thereabout. Ports 70 preferably pass from an inner surface to an outer circumference of blade 20. The chemical preferably travels under pressure from an inlet disposed in an interior portion of blade 20 to an exterior circumference thereof. Pressure used to supply the chemical to blade 20 can be generated through virtually any manner known such as, but not limited to, an elevated supply tank, an electric pump, a manual pump, a gas pump, a pressurized gas disposed above the chemical in a sealed tank, etc. In order to provide a flow of the chemical to ports 70, when their distal end is positioned substantially beneath drum 10, it is preferable that the chemical be made to travel through axle 40, which is fixedly connected to handle 30. Hollow projection 100 is preferably disposed, in a downwardly projecting manner (determined by user operation), perpendicular to and on axle 40, within an inner circumference of blade 20. A frictionally sliding interface is preferably created between a distal end of this projection and an inner circumference of blade 20. Seal 110 is preferably disposed upon the distal end of projection 100, thus reducing or eliminating any leakage of chemical from between the two surfaces. While seal 110 can be made from any of the various materials typically used for such applications, seal 110 is preferably made from "Teflon", as manufactured by Dupont, or a rubber. In this embodiment of the present invention, while in operation, the chemical preferably passes through an interior portion of axle 40. The chemical then travels down projection 100, past seal 110 and through ports 70 of blade 20 as they come into alignment with projection 100.

Figure 3:
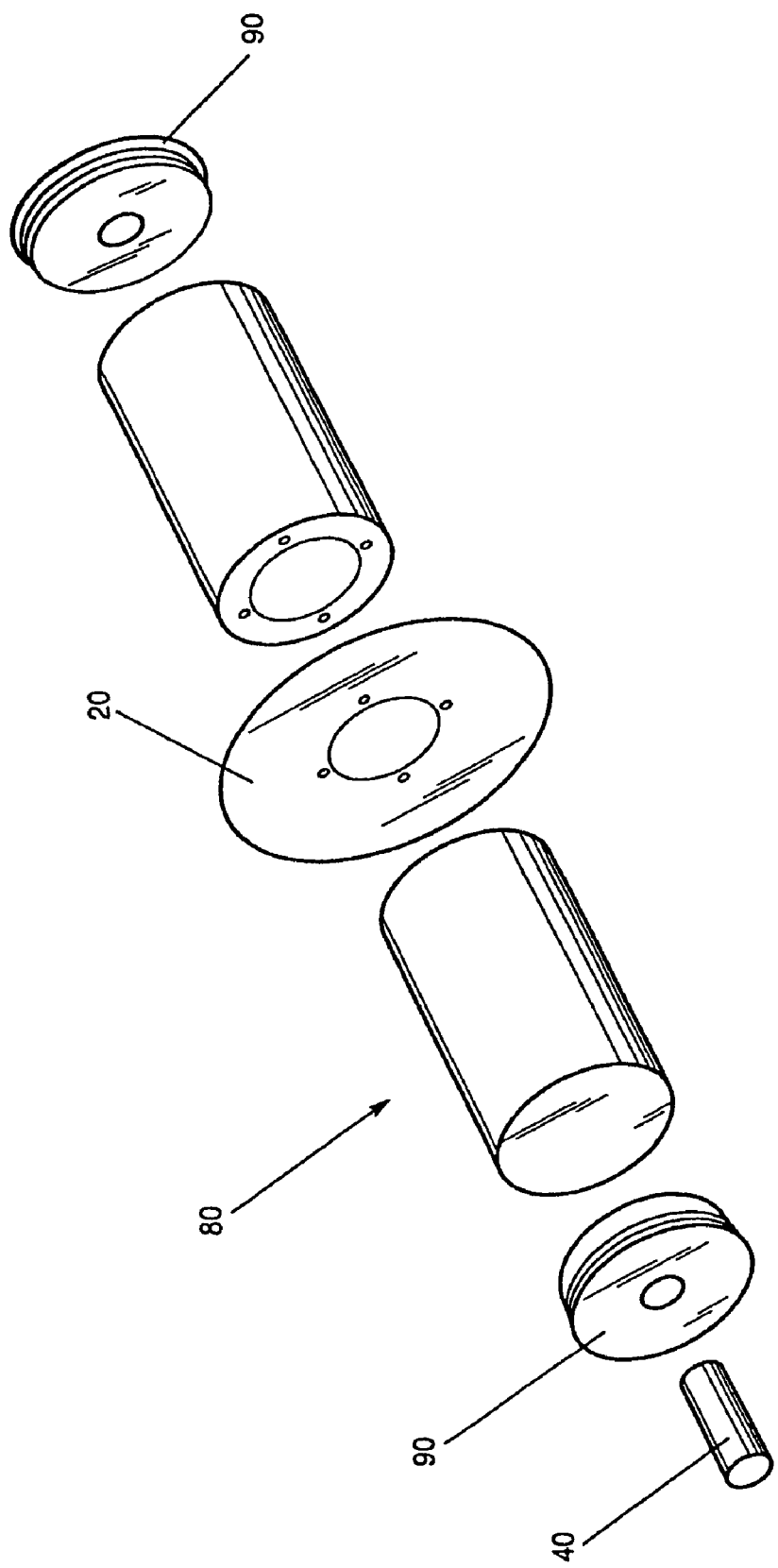
FIG. 3 is an exploded perspective view showing the basic construction of the roller of the FIG. 1 embodiment.

FIG. 3 shows an expanded view of the primary components of an embodiment of the present invention. In this embodiment drum 10 comprises two halves 80 which sandwich blade 20. End-caps 90 are preferably threaded and screw into an external end portion or halves 80. A hole is preferably disposed through a substantially central portion of end-caps 90, through which axle 40 passes from an exterior to an interior portion of drum 10.

Figure 4:
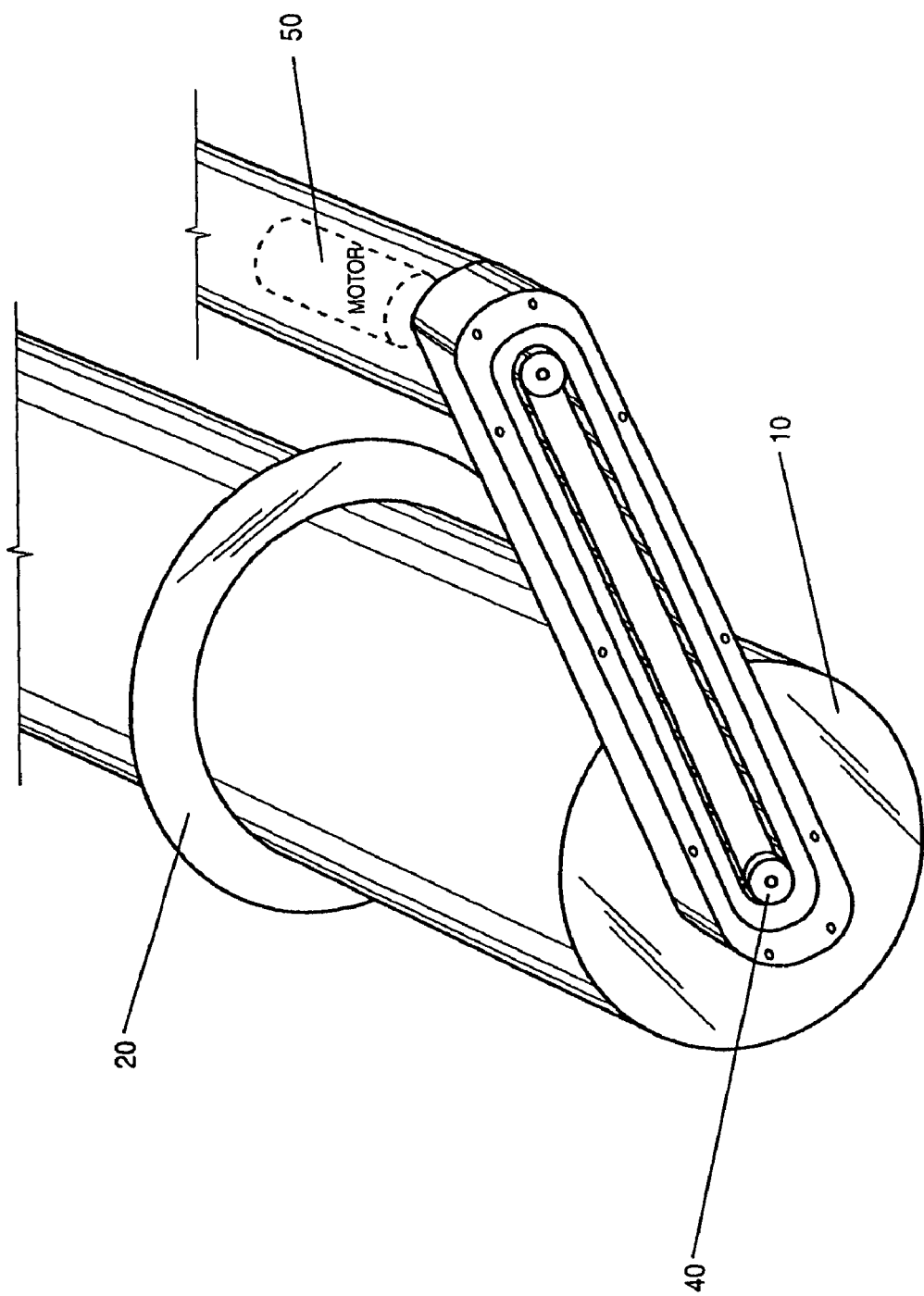
FIG. 4 is a perspective view showing a motor and drive mechanism mounted outside the drum of the FIG. 1 embodiment.
Figure 5:
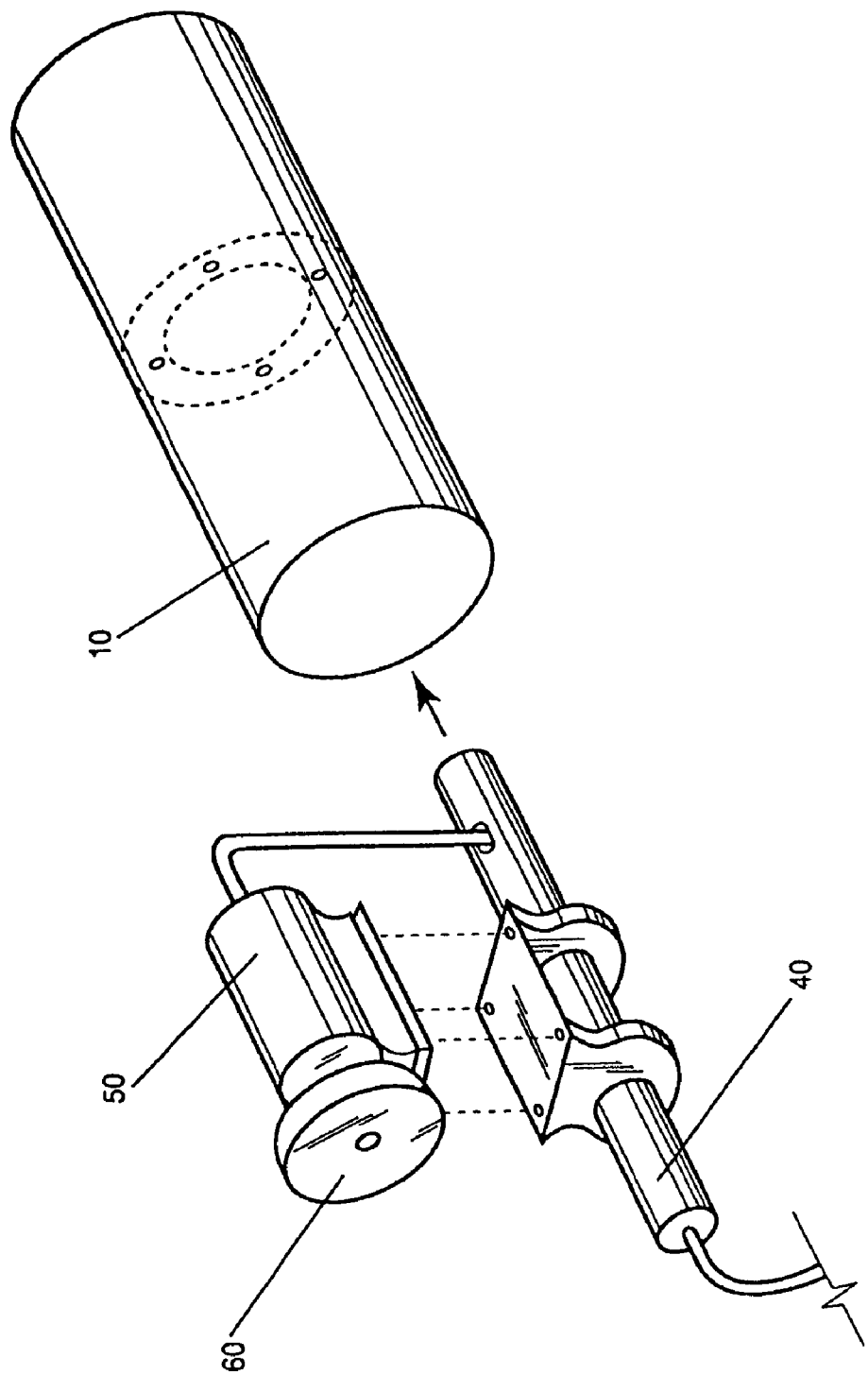
FIG. 5 is a perspective view showing an internal drive mechanism removed from the drum of the FIG. 1 embodiment.

Referring now to FIGS. 4 and 5, motor 50 can be disposed in such a manner as to enable drum 10 to be powered. While motor 50 can be powered by hydraulic, pneumatic, or any other source, motor 50 is preferably an electrically powered motor. Motor 50 is most preferably a 110 volt AC motor or a 12 volt DC motor. Motor 50 can, of course, easily be replaced by a small engine which runs off of gas, diesel or another fuel, and this also produces desirable results. As shown in FIGS. 4 and 5, motor 50 can be disposed within drum 10 or external to drum 10. If motor 50 is disposed exterior to drum 10, a driving chain, belt, shaft, gear, or other mechanism, adaptable for such purposes by those skilled in the art, is preferably provided to cause drum 10 to rotate about axle 40. If motor 50 is disposed within drum 10, a mechanism is preferably provided which imparts the rotational energy from motor 50 to drum 10. Such mechanism can include, and is not limited to, gears as well as belts and pulleys and other commonly known mechanisms. Internally mounted motor 50 preferably imparts rotational energy to drum 10 through the aid of a frictional interface between an inner surface of drum 10 and motor 50. Motor 50 is preferably secured to axle 40, motor 50 has a rubber drive wheel 60 disposed on its shaft, and drive wheel 60 resides in a mutually communicable manner with an inner surface of drum 10.

Figure 8B:
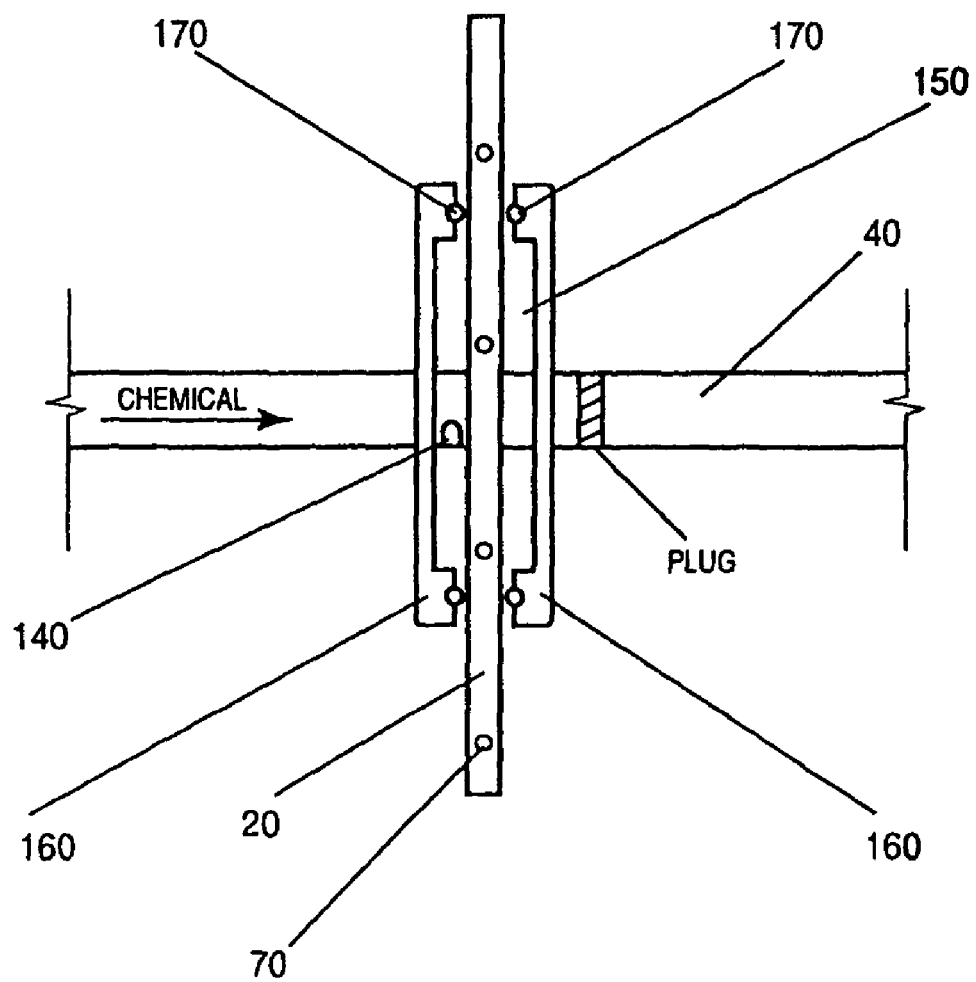
FIG. 8B is an alternative view of the embodiment of FIG. 8A wherein the pumps have been removed to more clearly depict this embodiment.

The chemical can be applied to blade 20 by piston pumps 120, depicted in FIG. 8A. In this embodiment, piston pumps 120 are disposed at an inner portion of blade 20. The discharge of each pump is preferably connected to each of ports 70, thus forming a ring of pistons around axle 40. Axle 40 preferably has cam 130 disposed thereon. As drum 10 and blade 20 rotate about axle 40, cam 130 causes each of pistons 120 to be depressed as they become perpendicularly aligned with the wet concrete, thus injecting a chemical through their respective ports 70 and into the wet concrete. FIG. 8B shows a view of axle 40 and blade 20 having pistons 120 removed to more clearly show a way in which the chemical can be provided to pistons 120. In this embodiment, the chemical travels through axle 40, out of port 140 and into chemical chamber 150. Chemical chamber 150 is preferably formed by plate members 160, rigidly connected to axle 40, having seals 170 disposed on rim portions thereof. Seals 170 are preferably large o-rings and remain in frictional contact with inner side surfaces of blade 20. Thus, as drum 10 and blade 20 rotate about axle 40 and plate members 160, the chemical traveling into chemical chamber 150 is removed by the pumping action created by pistons 120 interacting with cam 130.

In another embodiment, as depicted in FIG. 9, gear pump 180 is preferably disposed in an inner portion of drum 10. Gear pump 180 is preferably rigidly connected to axle 40. Gear pump 180 preferably has roller 190 residing in a mutually communicable manner with it, such that as roller 190 rotates, gears of gear pump 180 rotate, thus pumping the chemical from axle 40 to ports 70. Roller 190 is preferably frictionally connected to an inner surface of drum 10. Since drum 10 rotates around axle 40 and since gear pump 180 is rigidly connected to axle 40, drum 10 rotates around gear pump 180. As drum 10 rotates around gear pump 180, roller 190 is caused to rotate due to the frictional interface between it and drum 10. Thus, gear pump 180 only operates when drum 10 is rotating. Gear pump 180 is preferably used in conjunction with the embodiment depicted in FIG. 8 where the chemical, after being discharged from pump 180, travels down projection 100, past seal 110 and through ports 70 of blade 20 as they come into alignment with projection 100. A further benefit which is realized by incorporating gear pump 180 in the above-described fashion is that the chemical is only pumped when the invention is in operation, and the amount pumped is directly proportional to the distance drum 10 is rotated. Thus, by altering such things as the size of gear pump 180, roller 190, and or inner diameter of drum 10, the amount of chemical pumped per distance traveled by the invention can be adjusted.

Figure 10:
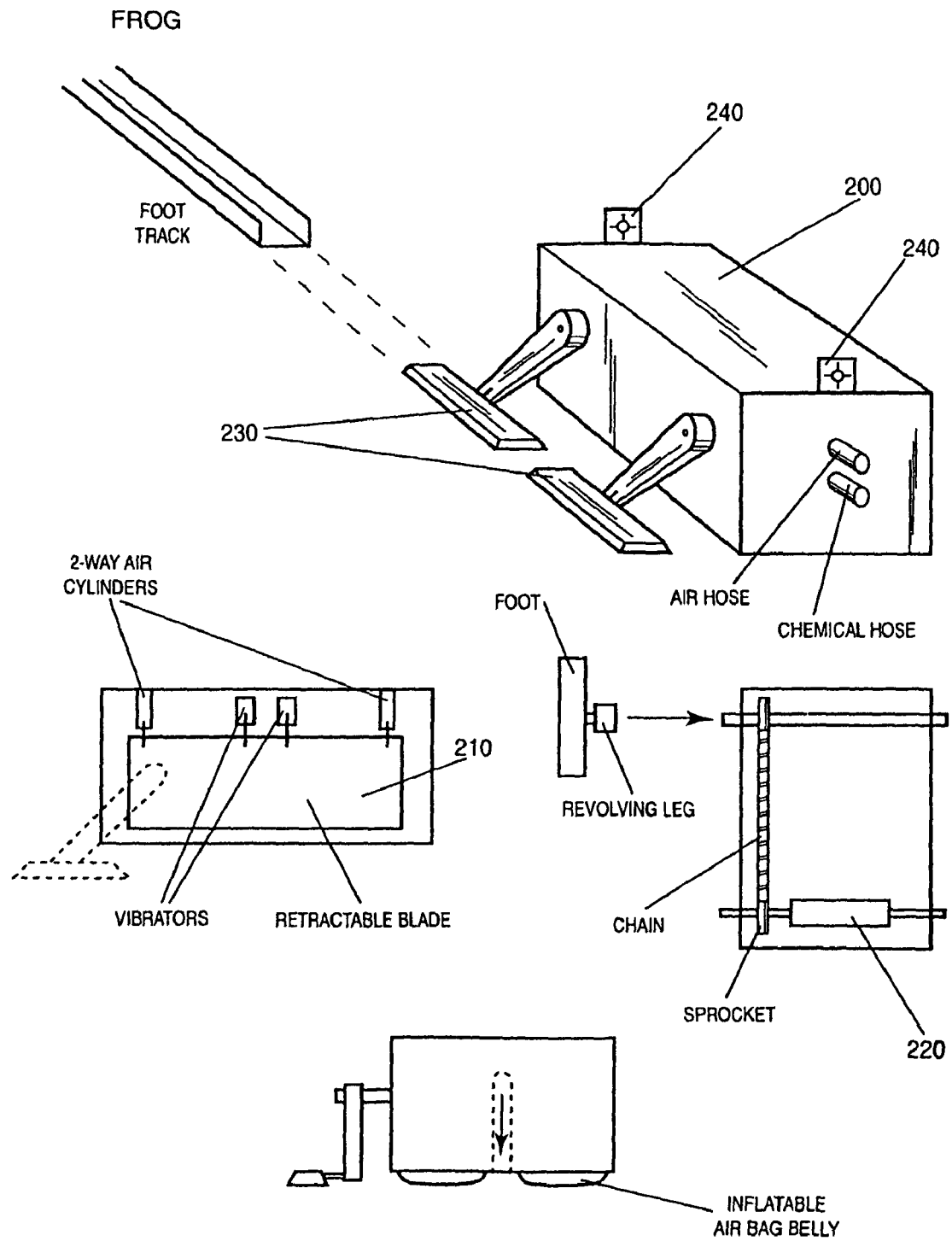
FIG. 10 shows an alternative embodiment for dispensing chemical into wet concrete.

In another embodiment, as depicted in FIG. 10, a pneumatic or electrical apparatus 200 is made to traverse the portion of wet concrete to be treated. Apparatus 200 preferably has a retractable blade 210 which is capable of being inserted into the wet concrete, preferably with a vibratory action. Upon removal of blade 210, apparatus preferably injects a dosed amount of the chemical into the gap created by blade 210. Apparatus 200 then travels a small distance and repeats this process until an entire line of concrete has been treated. In one embodiment, apparatus 200 operates in an action similar to that of a "frog". Apparatus 200 preferably drags behind it all hoses and or lines needed for its operation. Pneumatic motor 220 is preferably connected to legs 230; thus, when air is supplied to motor 220, legs 230 rotate one revolution, thus causing the apparatus to take on a "hopping" motion. Numerous manners of guiding apparatus 200 can easily be devised by those skilled in the art, however, apparatus 200 is preferably guided through the use of foot tracks, string, or a laser.

If foot tracks are employed, they are preferably positioned across the portion of concrete to be treated. They preferably have a channel shape which prevents legs 230 wandering out of them. If string is employed, apparatus 200 preferably has guides 240 disposed on an upper portion thereof. String is then passed through guides 240 and each end of the string is then secured to stakes which have been previously disposed outside of each end of the portion of the concrete to be treated. Guides 240 are preferably elliptically shaped (height diameter greater than width diameter). This prevents apparatus 200 from deviating left or right, but enables it to rise and fall as it traverses the portion to be treated.

In each of the above-described embodiments, the chemical can be applied to the blade structures in any manner known to those skilled in the art. As such, the chemical can be applied to the blades simply by spraying the blades with a common hand-operated spray device. For example desirable results can be produced using any of the above-described embodiments wherein the chemical is applied to the blade by spraying the chemical from a simple squirt bottle or hair-spray type bottle.

Figure 11B:
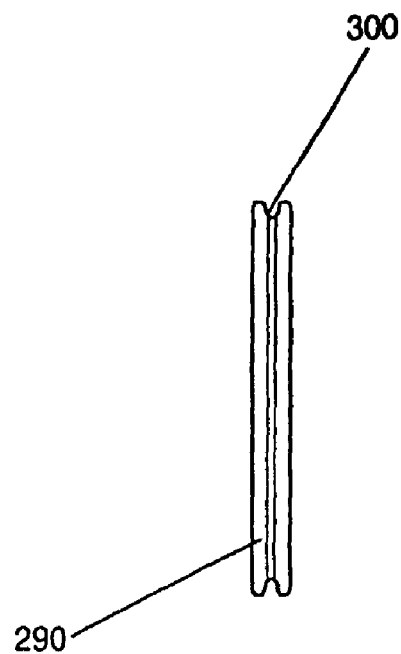
FIG. 11B is a front view of the blade with a groove for placing chemical containing rope into wet concrete.

Referring now to FIG. 11, in another embodiment, rope 250 is saturated with the chemical. Spool 260, containing a roll of rope 250, is then preferably disposed on handle 270 of the apparatus. As in previous embodiments, handle 270 is preferably connected to a large, preferably hollow, drum-like structure 280. Drum 280 preferably has blade 290. Blade 290 preferably has groove 300 disposed about its circumference, within which rope 250 resides. Guide wheel 310 is preferably disposed near an external circumference of blade 290. Guide wheel 310 thus enables rope 250 to properly feed into groove 300. Scraper 320 is preferably provided to scrape away wet concrete which clings to blade 290. Prior to use, a user preferably feeds a portion of rope through guide wheel 310 and around blade 290. As drum 280 rotates, rope 250 is pulled from spool 260 around blade 290, thus forcing rope 250 into the wet concrete. When the portion of wet concrete has been traversed with the apparatus, a user simply cuts the rope and the process is repeated for the next portion of wet concrete to be treated. Rope 250, with chemical disposed therein and thereon, is left imbedded in the concrete. The chemical preferably diffuses into the portion of wet concrete immediately surrounding the rope, thus delaying the setting of this portion of concrete and therefore enabling a pre-stressed zone to be created therein.

The present invention is not limited to simply creating cracks at right angles to side portions thereof. Rather the present invention is a method that can be used to create geometric-shaped cracks in concrete in a manner that will be apparent to as those skilled in the art upon reading this application.

Although more desirable results are obtained by providing a method to dispose the chemical into wet concrete, desirable results can be obtained by virtually any manner which enables a chemical to be disposed on top of, or introduced into an area of wet concrete. For example, in an embodiment of the present invention, a user can simply spray a region of wet concrete using a hand squirt bottle

INDUSTRIAL APPLICABILITY

The invention is further illustrated by the following non-limiting example.

Example

A slab of concrete having a thickness of six inches was poured. Before the concrete set, the rotary-blade apparatus of the present invention was used to apply Regular Strength Surface Etch Retarder (containing 10%-30% D-Organic Acid), manufactured by Unitex, according to the above teachings. The blade in this experiment was set to three different depths to compare the results obtained when chemical was applied at different depths in concrete.

Figure 12:
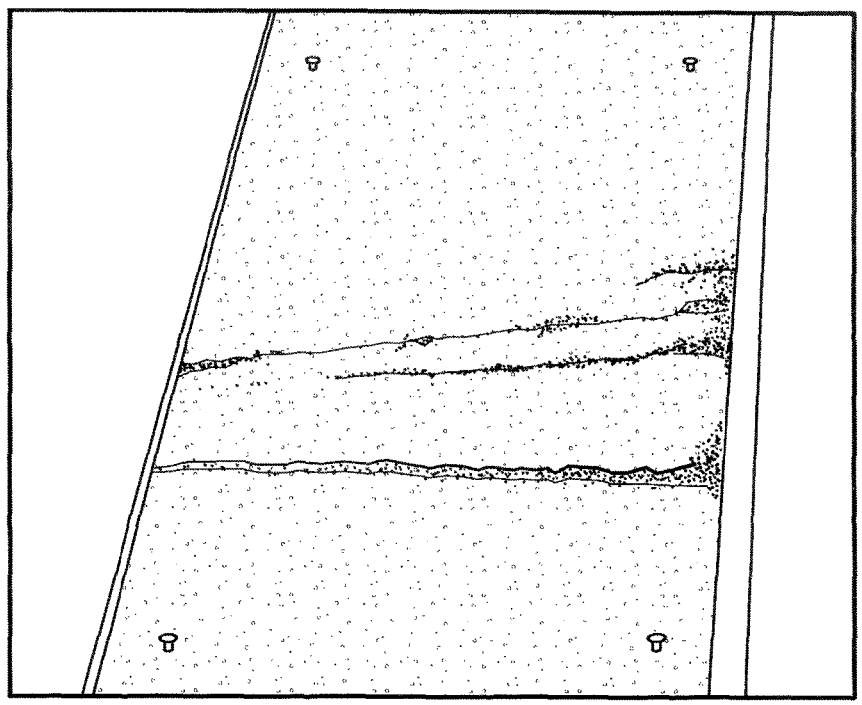
FIGS. 12-14 are drawings showing overstressed zones or cracks produced in concrete using the present invention.

FIG. 12 shows the crack formed when the blade of the apparatus of the present invention was allowed to penetrate to a depth of one and one-half (1.5) inches. Although the surface of the concrete in this test was not subsequently smoothed very much, as evident by the marks left by the roller, the crack formed was very prominent and substantial, as can be seen.

Figure 13:
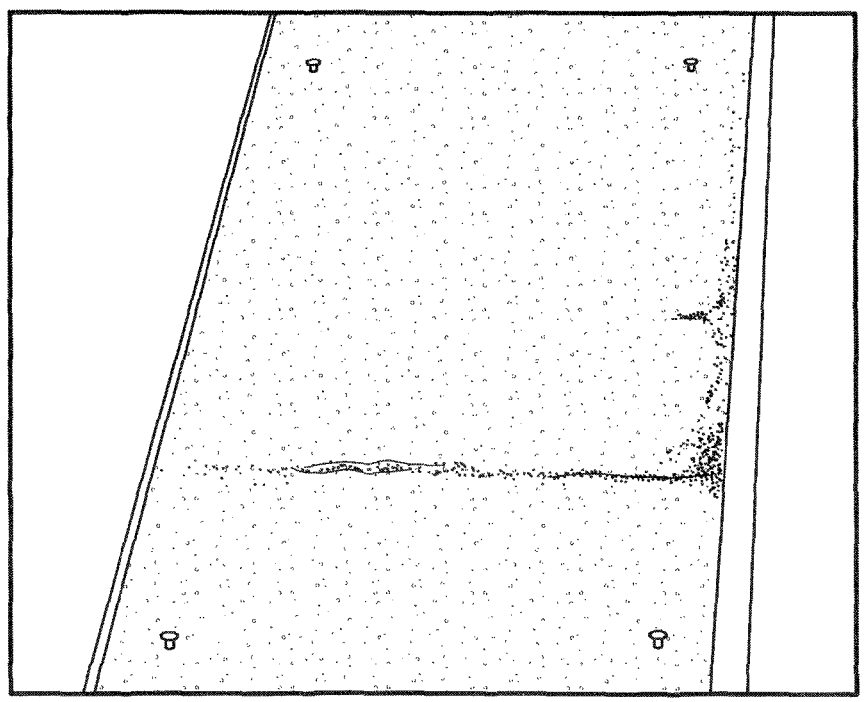

FIG. 13 shows the crack formed when the blade of the apparatus of the present invention was allowed to penetrate to a depth of one (1) inch. Although the crack formed from this test is less prominent than that displayed in FIG. 12, FIG. 13 shows that desirable results can be obtained with the present invention when the chemical is applied to a depth of one inch in a six inch thick slab of concrete.

Figure 14:
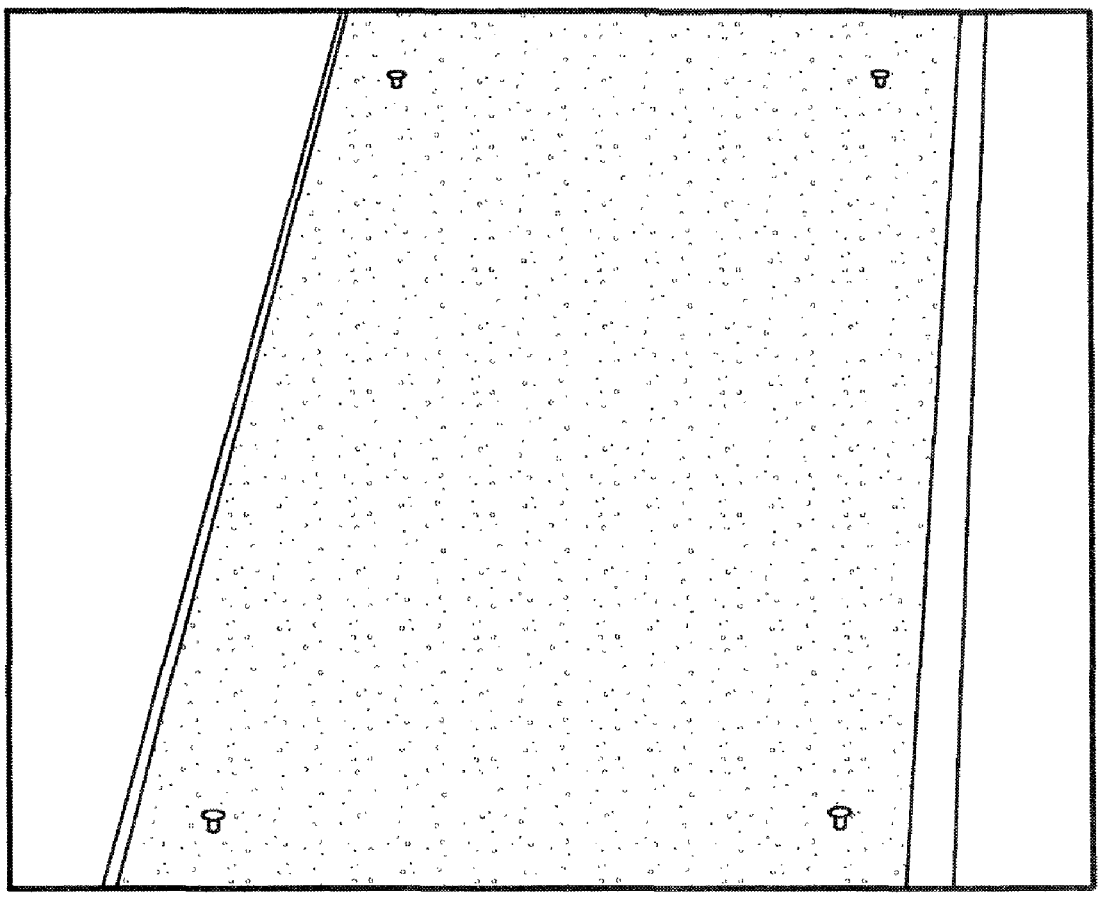

FIG. 14 shows the crack formed when the blade of the apparatus of the present invention was allowed to penetrate to a depth of one-half (0.5) of an inch. Although the crack displayed in this figure appears to be very small, this test shows that cracks in a concrete slab having a thickness of six inches can be produced when chemical is applied to a depth of only one-half of an inch.

Figure 15:
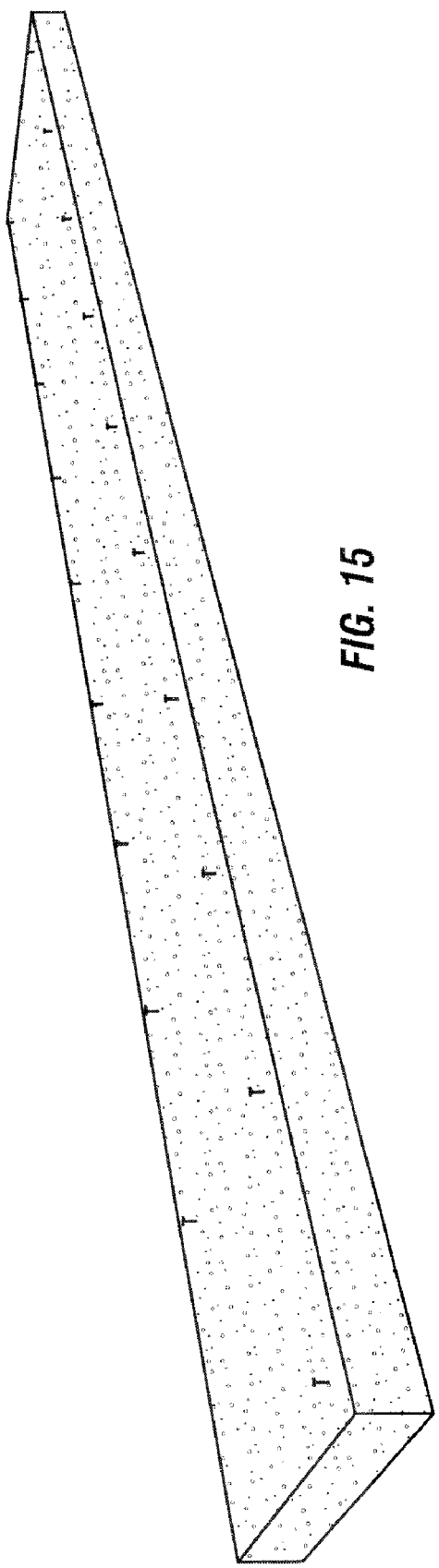
FIG. 15 is a drawing showing the slab of concrete that was used for testing the present invention.

FIG. 15 shows the entire test slab that was used for the tests of this example.

The preceding examples can be repeated with similar success by substituting any of the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above and/or in the attachments, and of the corresponding application(s), are hereby incorporated by reference.

What is claimed is:

1. A method for creating a pre-stressed zone in concrete comprising:

physically penetrating a top surface of wet concrete;

applying a chemical which retards or inhibits the setting of wet concrete at the physical penetration;

retarding or inhibiting the setting of the wet concrete; and thereafter setting the wet concrete.

2. The method of claim 1 wherein penetrating comprises rolling a substantially circular blade at least partially through a portion of the wet concrete.

3. The method of claim 1 wherein penetrating comprises pressing a blade at least partially into a portion of the wet concrete.

4. The method of claim 1 wherein applying a chemical comprises disposing the chemical on a blade and placing the blade at least partially into the wet concrete.

5. The method of claim 1 wherein applying a chemical comprises placing a chemical-saturated rope below the top surface of the wet concrete.

6. The method of claim 5 further comprising disposing the rope at least partially within the wet concrete.

7. The method of claim 6 wherein disposing the rope at least partially within the wet concrete comprises disposing the rope at least partially around a circumference of a substantially circular rotatable blade.

8. The method of claim 1 wherein applying a chemical comprises inserting the chemical into an opening in the wet concrete created by a blade.

9. The method of claim 1 wherein applying a chemical comprises applying the chemical below the top surface of the wet concrete.

10. The method of claim 1 further comprising smoothing the wet concrete.

11. The method of claim 1 wherein the chemical comprises an organic solvent.

12. The method of claim 1 wherein the chemical comprises aromatic 100.

13. The method of claim 1 wherein the chemical comprises mineral spirits.

14. The method of claim 1 wherein the chemical comprises a sugar-water solution.

15. A method for creating a pre-stressed zone in concrete comprising:

applying a chemical which retards or inhibits the setting of wet concrete to only that portion of the concrete, when wet, wherein a crack is desired;

retarding or inhibiting the setting of wet concrete where the crack is desired; and allowing the concrete to set.

16. The method of claim 15 wherein the chemical comprises a sugar-water solution.

17. The method of claim 15 wherein the chemical comprises an organic solvent.

18. The method of claim 15 wherein the chemical comprises aromatic 100.

19. The method of claim 15 wherein the chemical comprises mineral spirits.

20. The method of claim 15 wherein the chemical comprises mineral spirits.

21. The method of claim 15 wherein the chemical is applied to a surface of only that portion of a wet concrete wherein a crack is desired.

22. The method of claim 15 wherein the chemical is applied in a substantially straight line.

23. The method of claim 15 wherein chemical is disposed at least partially beneath a surface of only that portion of a wet concrete wherein a crack is desired.

\* \* \* \* \*